(12) United States Patent
Chitkara et al.

(10) Patent No.: US 11,563,563 B2
(45) Date of Patent: Jan. 24, 2023

(54) SQL EXTENSION FOR SECURE ENCRYPTION KEY TRANSFER

(71) Applicant: SAP SE, Walldorf (DE)

(72) Inventors: Rajnish Chitkara, Fremont, CA (US); Ramesh Gupta, Pune (IN); Asif Iqbal Desai, Waterloo (CA)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 16/677,134

(22) Filed: Nov. 7, 2019

(65) Prior Publication Data

US 2021/0143989 A1    May 13, 2021

(51) Int. Cl.
*H04L 9/08*    (2006.01)
*H04L 9/14*    (2006.01)

(52) U.S. Cl.
CPC .......... *H04L 9/0825* (2013.01); *H04L 9/0836* (2013.01); *H04L 9/0863* (2013.01); *H04L 9/14* (2013.01)

(58) Field of Classification Search
CPC ... H04L 9/0822; H04L 9/0825; H04L 9/0836; H04L 9/0863; H04L 9/0897; H04L 9/14
See application file for complete search history.

(56) References Cited

U.S. PATENT DOCUMENTS

| | | | | |
|---|---|---|---|---|
| 6,044,155 A | * | 3/2000 | Thomlinson | G06F 21/6245 380/277 |
| 10,922,423 B1 | * | 2/2021 | Rungta | G06F 21/577 |
| 2003/0046572 A1 | * | 3/2003 | Newman | H04L 9/0891 713/193 |
| 2006/0036448 A1 | * | 2/2006 | Haynie | G06Q 10/10 705/37 |
| 2007/0276765 A1 | * | 11/2007 | Hazel | G06K 7/082 705/71 |
| 2008/0033960 A1 | * | 2/2008 | Banks | G06F 16/242 |
| 2020/0125754 A1 | * | 4/2020 | Waldron | H04L 9/14 |

* cited by examiner

*Primary Examiner* — Carl G Colin
*Assistant Examiner* — Hany S. Gadalla
(74) *Attorney, Agent, or Firm* — Fountainhead Law Group P.C.

(57) ABSTRACT

Embodiments afford secure transfer of security key type(s) between different database servers having different key hierarchies. For example, a key transfer may occur from a source server to a target server during a database migration process. Particular embodiments comprise a SQL transfer command statement (e.g., TRANSFER ENCRYPTION KEY) recognized by an engine. Syntax of the SQL transfer command includes a password and a filename for a security key. Upon receiving the SQL transfer command, the engine references an information repository to identify a relevant key hierarchy and key type, encrypts the security key with a key derived from password, and stores (exports) the encrypted security key in a file for consumption (import) at the target server. The SQL transfer command may further comprise a direction component determining flow of key information, and an override function to deal with error messages arising from any already-existing security key having the same name.

17 Claims, 10 Drawing Sheets

SQL EXTENSION FOR SECURE ENCRYPTION KEY TRANSFER

BACKGROUND

Unless otherwise indicated herein, the approaches described in this section are not prior art to the claims in this application and are not admitted to be prior art by inclusion in this section.

Database servers support a hierarchy of encryption keys. A master key encrypts data encryption keys, which in turn are used to encrypt data.

For additional security, the master keys, or the data encryption keys, or both, may be encrypted using keys in an external keystore. Also, certain databases may support different data encryption keys for encryption of different objects (e.g., table columns).

This profusion of different keys, can render transfer of information from a source database to a target database (e.g., as part of a migration process), time-consuming and expensive. Accordingly, there is a need for a mechanism to efficiently and securely transfer security encryption keys.

SUMMARY

Embodiments provide a mechanism to securely transfer various security key type(s) between different database servers having different key hierarchies. For example, a key transfer may occur from a source server to a target server during a database migration process. Particular embodiments comprise a SQL transfer command statement (e.g., TRANSFER ENCRYPTION KEY) that is recognized by an engine. Syntax of the SQL transfer command includes a password and a filename for a security key. Upon receiving the SQL transfer command, the engine references an information repository to identify a relevant key hierarchy and key type, encrypts the security key with a key derived from a password, and stores (exports) the encrypted security key in a file for consumption (import) at the target server. The SQL transfer command may further comprise a direction component for determining the flow of key information, and an optional override function to deal with potential error messages arising from an already-existing security key having the same name at the target server. Embodiments thus allow customers to export and import encryption keys securely from the source server to a target server, using a compact, precise, and flexible SQL transfer statement.

The following detailed description and accompanying drawings provide a better understanding of the nature and advantages of various embodiments.

DETAILED DESCRIPTION

Described herein are methods and apparatuses implementing secure encryption key transfer across a database server. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
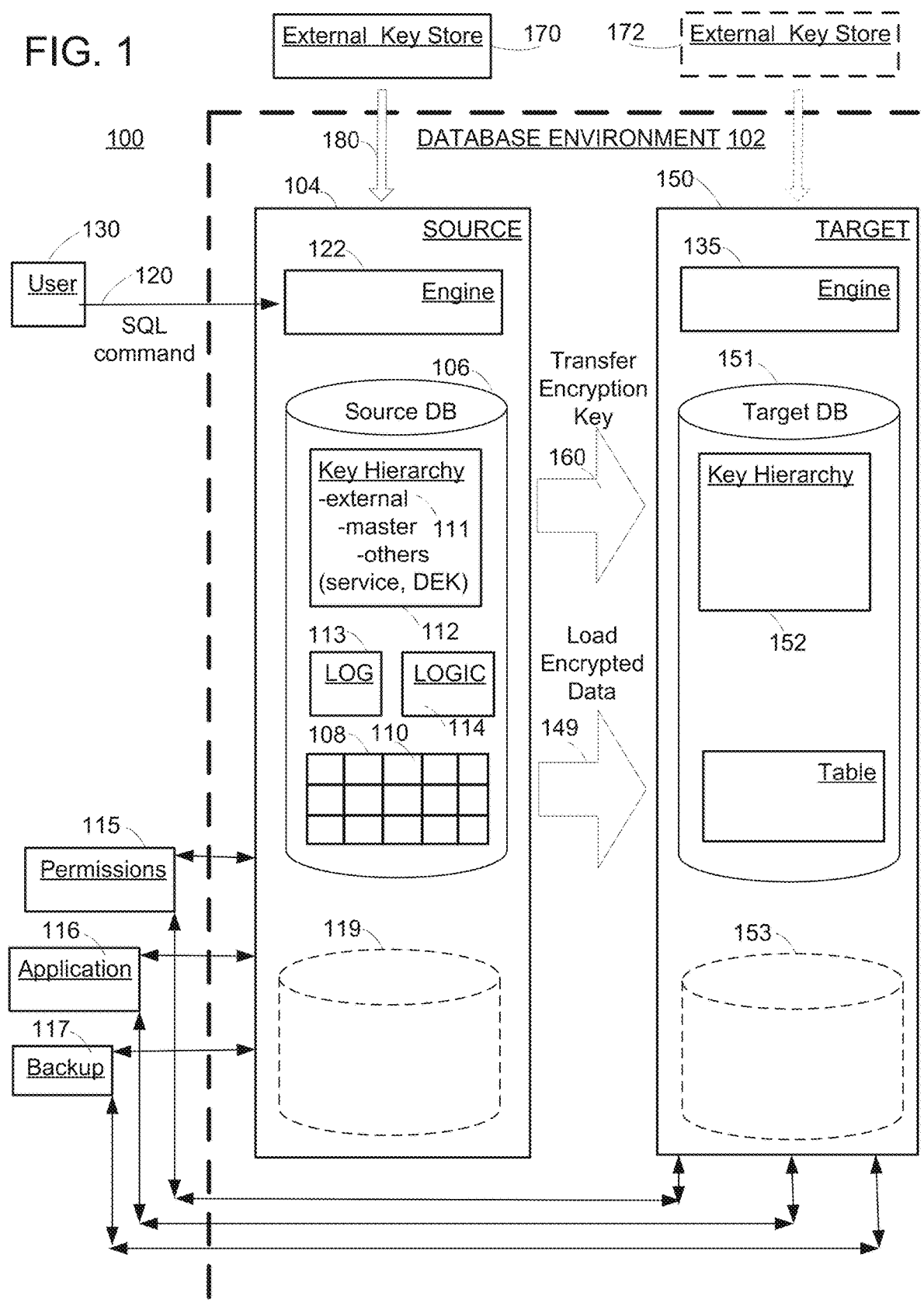
FIG. 1 shows a simplified diagram of a system according to an embodiment.

FIG. 1 is a simplified view of an embodiment of a system 100 that is configured to implement the transfer of security key information according to an embodiment. In particular, a database environment 102 comprises a source server 104, storing encrypted information for access by a customer.

Here, the source server comprises a source database 106 which includes a table 108 comprising columns 110. At least some data of the source database is encrypted according to encryption keys 111 of various types (e.g., master, service) and belonging to a hierarchy 112.

In addition to the tables storing confidential customer data, the source database may further include other information that is encrypted according to a security key, such as a data log 113. Also, the source database may include proprietary logic 114 for implementing the database, which is also protected from access by encryption according to a key.

It is noted that the source server of the database environment is not limited to a single database. Accordingly, FIG. 1 shows an additional database 119 as being present in the source server.

FIG. 1 also shows the source database being in communication with certain outside resources. For example, the source database may access an external permissions function 115 to determine the scope of access by particular users. The source database may access an external application 116 to store application-specific data. The source database may access backup 117 resources in order to preserve data outside of the database environment. One or more aspects of these external links to the source database may be controlled by security keys belonging to the hierarchy.

As part of a data migration process, it may be desired to load 149 encrypted information from the source database server to another (target) database server 150 having a target database 151 and optionally other databases 153. (As utilized herein, the term "load" refers to a mass loading of large volumes of encrypted data.)

However, the target database has its own key hierarchy 152, that is configured to store a variety of encryption key types. Accordingly, in order to simplify the transfer of security encryption keys to target database, the source database server further comprises an engine 122, and the target database further comprises an engine 135.

The engine 122 is configured to receive and recognize a SQL command 120 from a user 130. In response to that SQL command, the engine is configured to transfer 160 encryption key(s) encrypted with a key derived from password by storing (export) the encrypted security key in a file for consumption (import) at the target server engine. Such transferred encryption keys can occupy different levels of the key hierarchy, and can comprise encryption keys of various types as described later below.

The source server may be configured to receive some encryption keys 180 from an external key store 170—e.g., Hardware Security Module (HSM) or Key Management Interoperability Protocol (KMIP) server. In some embodiments, the target server may be configured to receive some encryption keys from a separate external key store 172. Further discussion of the role of external key store(s) in the key transfer process according to embodiments, is provided below in connection with the specific use cases of the example.

Further details regarding the SQL command are now described in connection with the simplified block diagram of FIG. 1A. In particular, the SQL command comprises the following components:
 a keyname 127;
 a user specified password 121;
 a filename 123;
 a direction 125; and
 (optionally) an override function 126.

Based upon receipt and recognition of the SQL command (and its various components), the engine is configured to reference different repositories of security encryption key information, and then to transfer (export and import) the encryption key(s) from the source database server to the target database server.

One repository 126 of key information stores hyperscalars key management service (KMS) keys. Another repository 128 of key information stores an encryption key hierarchy according to the Adaptive Server Enterprise (ASE) database format available from SAP SE and specifically described in the example below. Still another repository 130 of key information stores an encryption key hierarchy according to other database formats.

Encryption keys of various types 132 may be members of different key hierarchies. Examples of such encryption key types can include but are not limited to:
 external key(s)
 master key(s)
 database encryption key(s)
 column encryption key(s)
 service key(s)
 dual master key(s)
 recovery key(s)
 log encryption key(s)
 proprietary logic encryption key(s)
 backup encryption key(s)
 application data encryption key(s); and
 others.

Based upon key and key hierarchy information gleaned by the engine from the various repositories, and the password and filename components of the SQL command, the engine transfers an encrypted key(s) in a file 124.

Figure 1A:
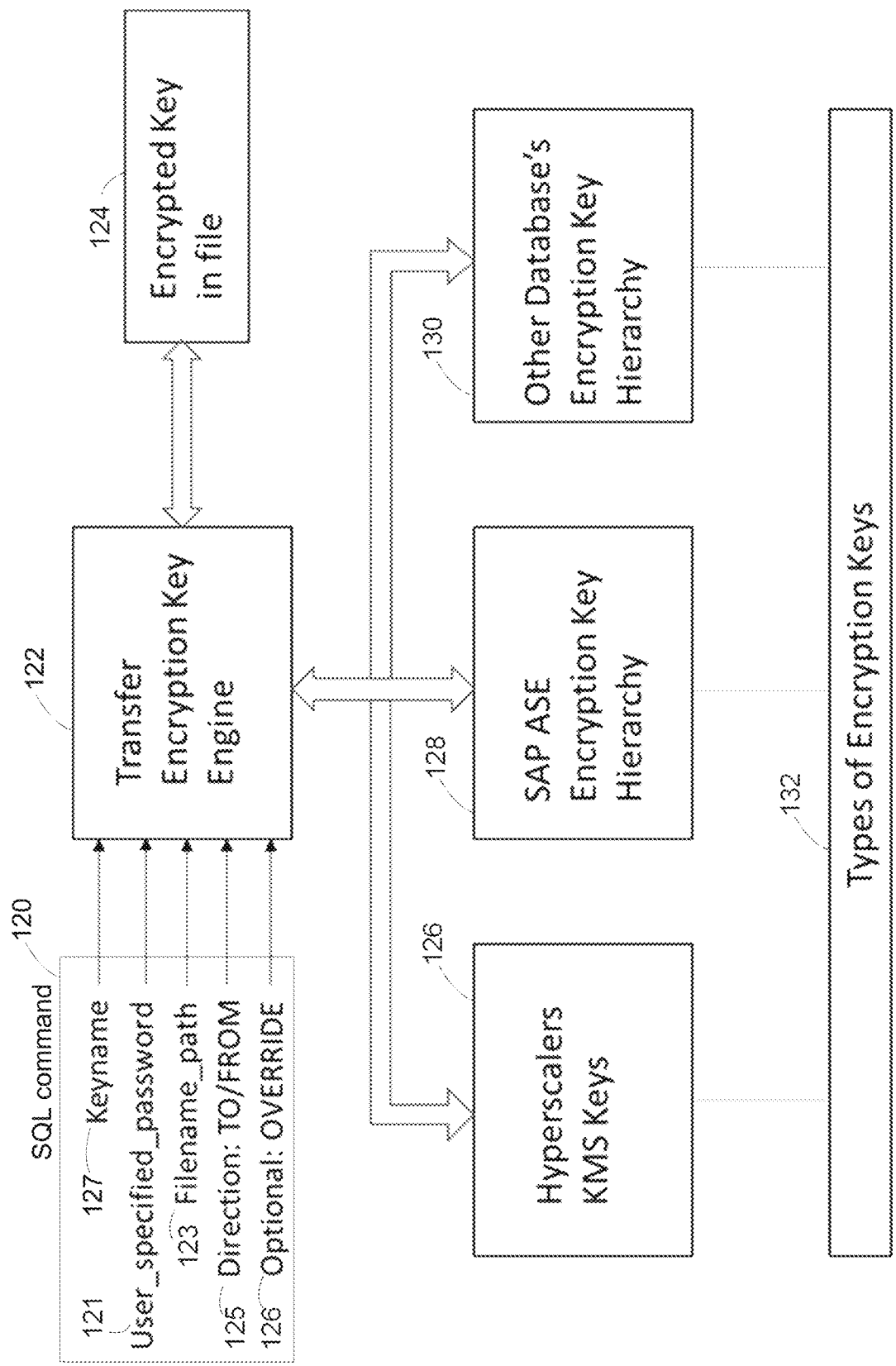
FIG. 1A is a simplified block diagram showing details of a system embodiment.

FIG. 1A shows that the SQL transfer command 120 includes the direction component 125. Based on the input direction, the engine may operate in 2 modes. When the direction is TO, keys encrypted with user_specified_password are transferred from the provider's system into the file. When the direction is FROM, keys are transferred from the indicated file to the provider's system.

Based on the direction value (TO or FROM) of the SQL transfer command, the transfer encryption key engine can be operated at the source or the target system. The Direction=TO, indicates the source system. The direction=FROM, indicates the target system.

FIG. 1A further shows that the SQL transfer command includes an optional OVERRIDE component 126. That override may be useful to address the possibility that a same key already exists on the target.

The override component recognizes a possible error message arising from a key duplicate, and takes action to remove the conflict between multiple key copies on the same server. In some embodiments, the OVERRIDE component may delete the existing key copy. In other embodiments, the OVERRIDE component may re-name the existing key copy.

Further discussion of the OVERRIDE component is provided in connection with FIGS. 8 and 9 below, illustrating the third and fourth use cases of the example.

Returning to FIG. 1, upon receipt of the encryption key the target server stores that key within the target key hierarchy 152. The key may be referenced by the target server in decrypting database data (e.g., in response to a query), that has been loaded from the source database in encrypted form (as part of database migration).

Figure 2:
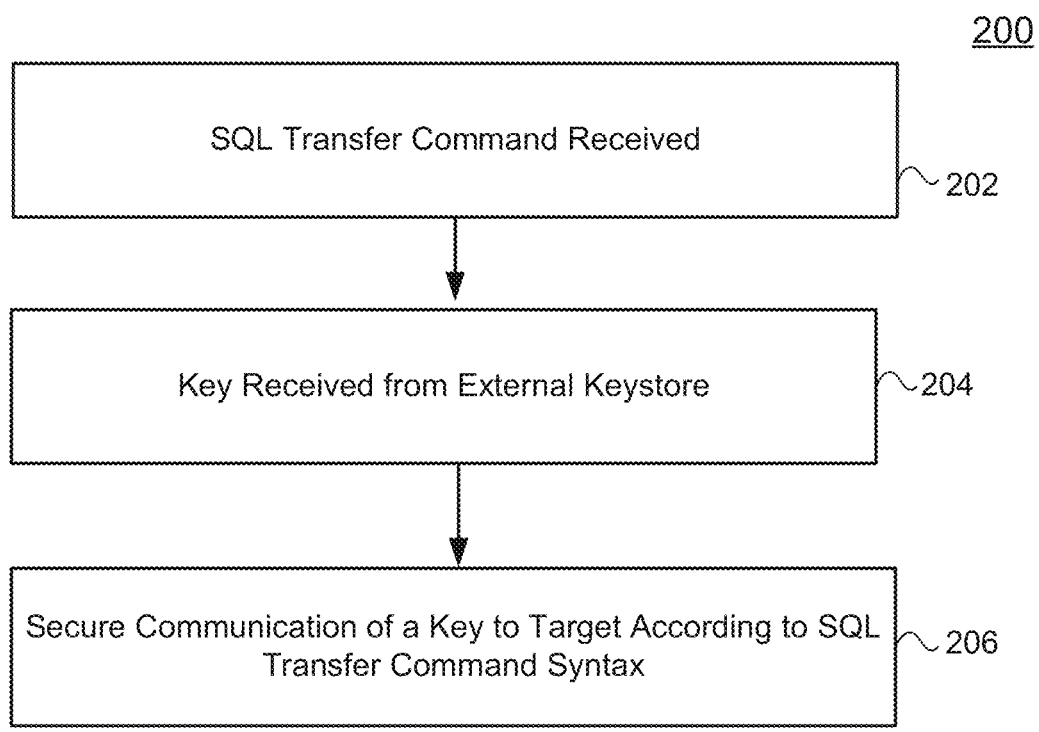
FIG. 2 shows a simplified flow diagram of a method according to an embodiment.

FIG. 2 is a flow diagram showing various actions taken in a method 200 according to an embodiment. At 202, the transfer command is received having a syntax including a password, a filename, and a keyname of an individual security key or a first security key of a key hierarchy of a source database;

At 204, a second security key used to decrypt the first security key, is received from an external key store.

At 206, in response to the transfer command, the first security key is communicated securely according to the SQL command details, to a target database also receiving encrypted information loaded from the source database.

Once transferred, the security key can be referenced to decrypt encrypted information at the target database, upon receiving a query from a user.

Embodiments may offer certain benefits over conventional approaches. For example, this embodiment may employ a concise SQL statement for transferring encryption keys from a source server to a target server.

Moreover, embodiments may offer flexibility in key transfer. That is, various different types of encryption keys can be transferred using a same SQL statement.

Embodiments may also permit the implementation of additional security features. For example, based upon the various types of encryption keys, appropriate permissions may be checked by the SQL statement.

Finally, it is noted that no external tool may be required in order to accomplish encryption key transfer according to embodiments. Rather, the processing power available to the engines of the various databases can be leveraged to perform various transfer tasks.

Further details regarding security key transfer according to embodiments, are now provided in connection with a particular example and use cases involving specific elements available from SAP SE, of Walldorf, Germany.

EXAMPLE

Figure 3:
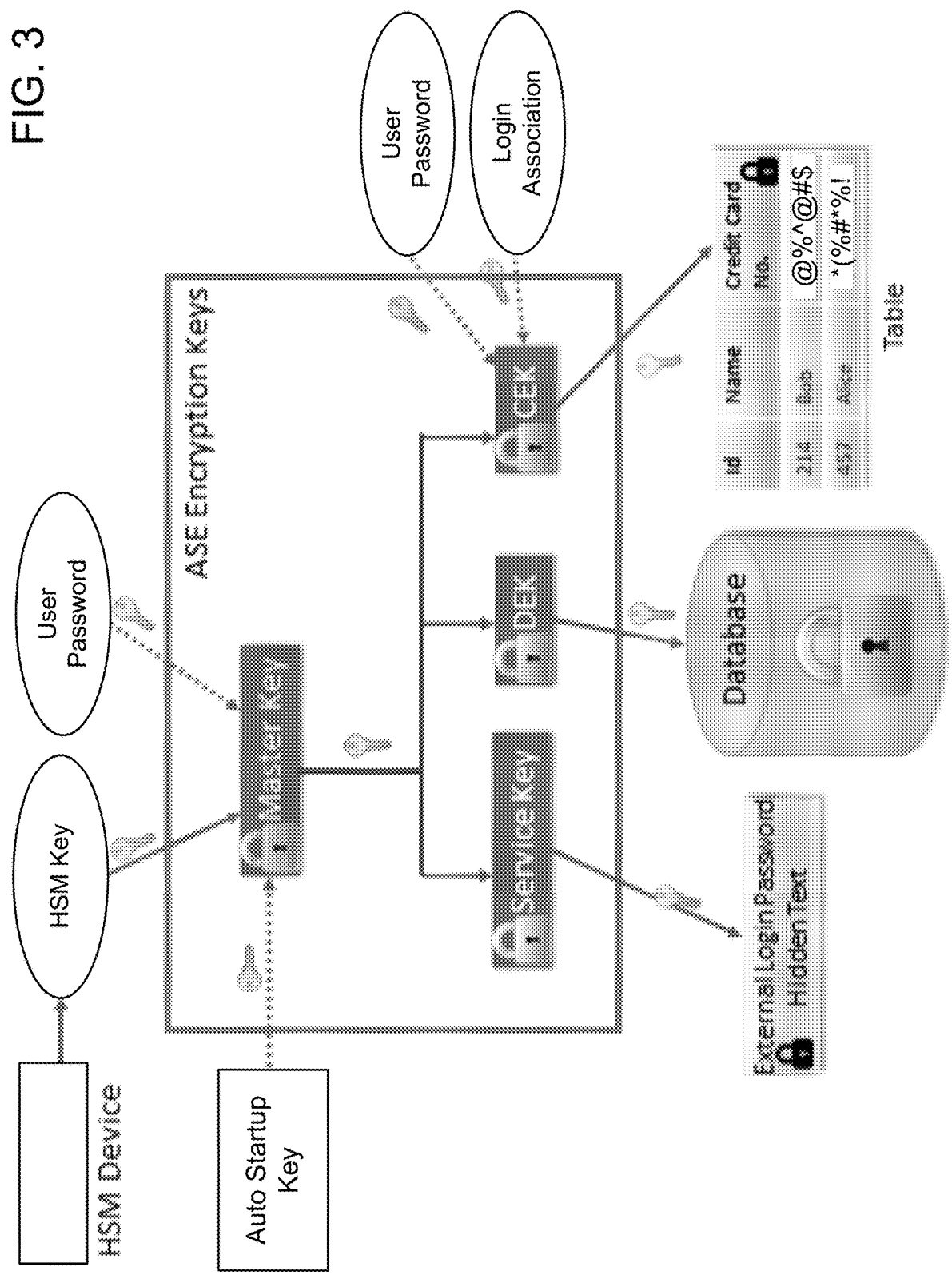
FIG. 3 shows a simplified diagram of one example of a database environment containing a hierarchy of encryption keys utilized for transfer according to an embodiment.

Here, the Adaptive Server Enterprise (ASE) database environment available from SAP SE, supports a hierarchy of different encryption keys. FIG. 3 shows a diagram of the ASE database environment. In this simplified example, the data is stored in a database table having columns designating an identifier, a first name, and a (sensitive) credit card number.

The entire content of the database may be encrypted according to a database encryption key (DEK). The particularly sensitive content of the last, credit card number column, may be encrypted according to a column encryption key (CEK).

Specifically, a master key encrypts data encryption keys, which in turn are used to encrypt data. In order to impart additional security, the ASE environment may encrypt the master keys, the data encryption keys, or both, using keys in an external keystore—a Hardware Security Module (HSM) Device.

The ASE environment may also support different encryption keys for encryption of different objects. Thus ASE offers column encryption keys (CEK), database encryption keys (DEK), and service keys. A CEK is used to encrypt columns in tables while a DEK is used to encrypt a full database.

In order to migrate encrypted data from one database server to another, a quantity of data is taken and loaded at the target server. To access the encrypted data at the target server, the hierarchy of encryption keys must be accessible at the target server.

Thus, when a data encryption key is encrypted with master key, master key needs to be accessible at the target server. Where the master key is encrypted with a key from external keystore at the source server, and the external keystore is not accessible at the target server, a mechanism is required to securely transfer the data encryption key and/or master key from the source server to the target server.

In this particular example, the SQL statement titled: "TRANSFER ENCRYPTION KEY" is implemented to allow customers to export and import data encryption keys and/or master keys securely from the source server to target server.

With TRANSFER ENCRYPTION KEY statement, data encryption keys and/or master keys are encrypted with a key derived from user-supplied password at the source database server and exported to a file. The password and file name are supplied with the TRANSFER ENCRYPTION KEY statement.

The key can be imported at the target ASE server by specifying the same user password. During the import, the master key is re-encrypted with target server's key from external keystore.

In the ASE database environment, importing master key in a particular database will create the master key at the target server encrypted with the key from external keystore. Where a key from external keystore does not exist on the target server, the master key will be maintained in the encrypted form with the user specified password in the TRANSFER ENCRYPTION KEY statement.

Also, importing data encryption keys in a particular ASE database will create the data encryption keys at the target server encrypted with the master key of the corresponding database. If the master key of the corresponding database does not exist on the target server, the data encryption key will be maintained in the encrypted form with the user specified password in the TRANSFER ENCRYPTION KEY statement.

SAP ASE treats database encryption keys (DEK) a specific manner Database encryption keys reside in the master database only. Importing the DEK creates the DEK at the target server in master database encrypted with master key of master database. Where the master key of the master database does not exist on the target server, then the server produces an error because DEK cannot be kept encrypted with user password.

The syntax is for the TRANSFER ENCRYPTION KEY according to this example, is described as follows.

TRANSFER ENCRYPTION KEY [[<database_name>.]
    <owner>.]{<keyname>|*}
    WITH PASSWORD '<user-specified-password>'
    {TO|FROM}<filename>
    [WITH OVERRIDE]

According to this syntax:

<keyname> is the name of the key to be transferred/migrated/exported/imported.

* is a specific symbol designating all keys owned by <owner>.

<user-specified-password> specifies the password to use to encrypt/decrypt the key when exporting/importing.

TO|FROM indicates the direction of the transfer.

<filename> is the name of the file to store the encrypted key copy.

WITH OVERRIDE is a clause used to override the key while importing at the target ASE server if the key with same name already exists. Absent this clause, and given a key with same name already existing at target ASE server, an error may otherwise result.

When the key already exists while importing, and if there are keys encrypted with the key being transferred, validations may be performed to ensure that the raw key being imported can decrypt the existing keys encrypted with the key being imported.

According to this specific example, any key copies of the key being transferred are dropped. However, according to alternative embodiments, already-existing copies of the key being imported may be retained and re-named in order to afford for future access.

To provide further description of the embodiments, the following four (4) use cases are now described in connection with the simplified views of FIGS. 6-9.

Figure 6:
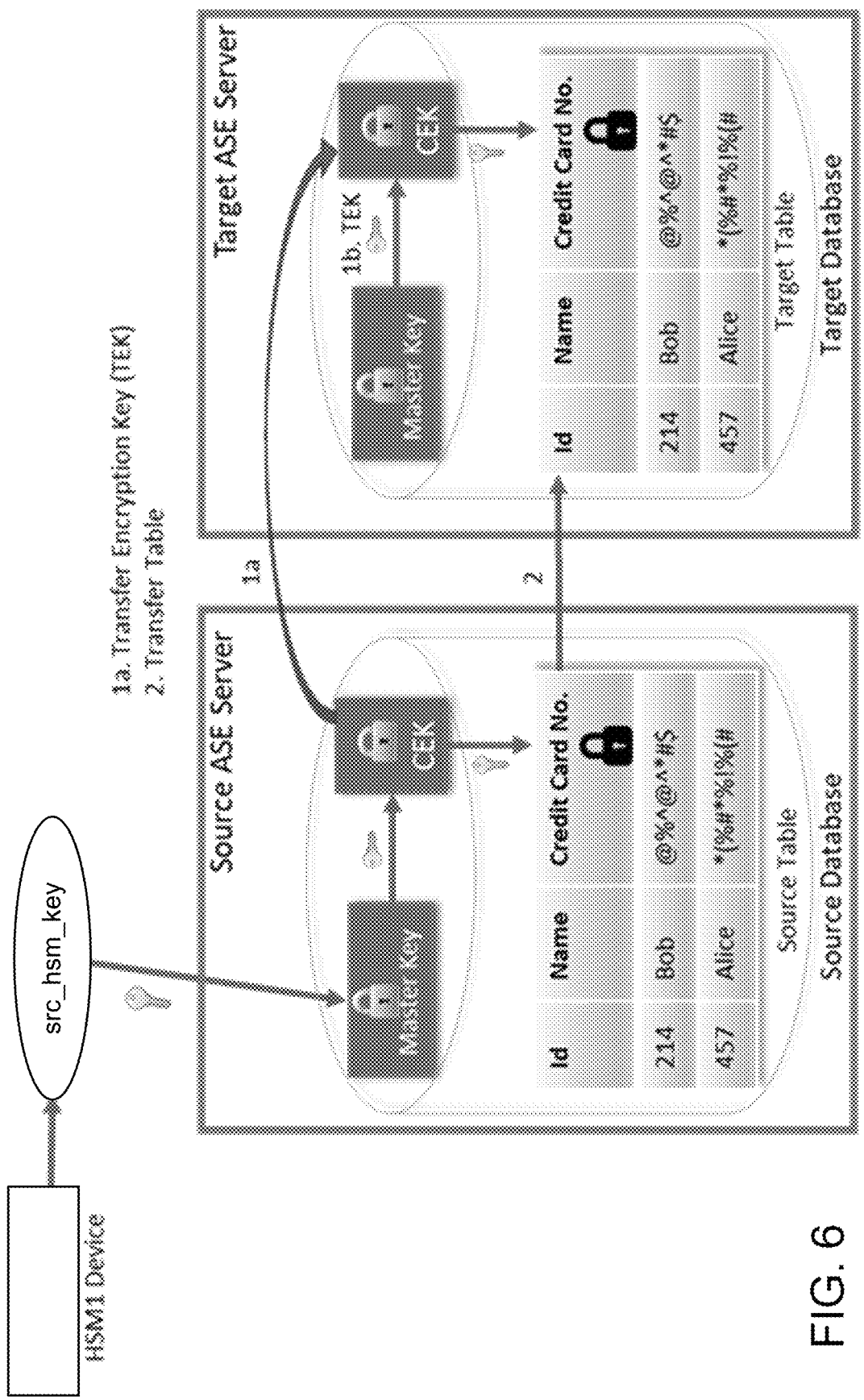
FIG. 6 illustrates a simplified diagram of a first use case according to the example.

FIG. 6 shows a simplified schematic view of a first use case involving transfer:
    of a database table with an encrypted column;
    from the source ASE server having master key encrypted with key from external keystore and the CEK encrypted with master key;
    to the target ASE server having no external keystore configured.

The following pseudocode summarizes operations at the source ASE database:

use master
create encryption key src_hsm_key on external keystore
create database src_db
use src_db
create encryption key master with external key
create encryption key cek with master key
create table src_tab(id int, name varchar(20),
    credit_card_no varchar(20) encrypt with cek)
insert into src_tab values(214, 'Bob', '1234-5678-9012-3456')
transfer table src_tab to 'src_tab.dat' for ase with encryption='true'
transfer encryption key cek
    with passwd 'mysecret8'
    to '/path/to/file'

At the target ASE database, the following pseudocode indicates that the CEK will be transferred using the file (1a in FIG. 6) and encrypted with master key on the target ASE database (1b in FIG. 6) as part of TRANSFER ENCRYPTION KEY statement.

```
use master
create database target_db
use target_db
create encryption key master with passwd 'Secret123'
set encryption passwd 'Sybase123' for key master
transfer encryption key cek
    with passwd 'mysecret8'
    from '/path/to/file'
create table target_tab(id int, name varchar(20),
    credit_card_no varchar(20) encrypt with cek)
transfer table target_tab from 'src_tab.dat'
```

Figure 7:
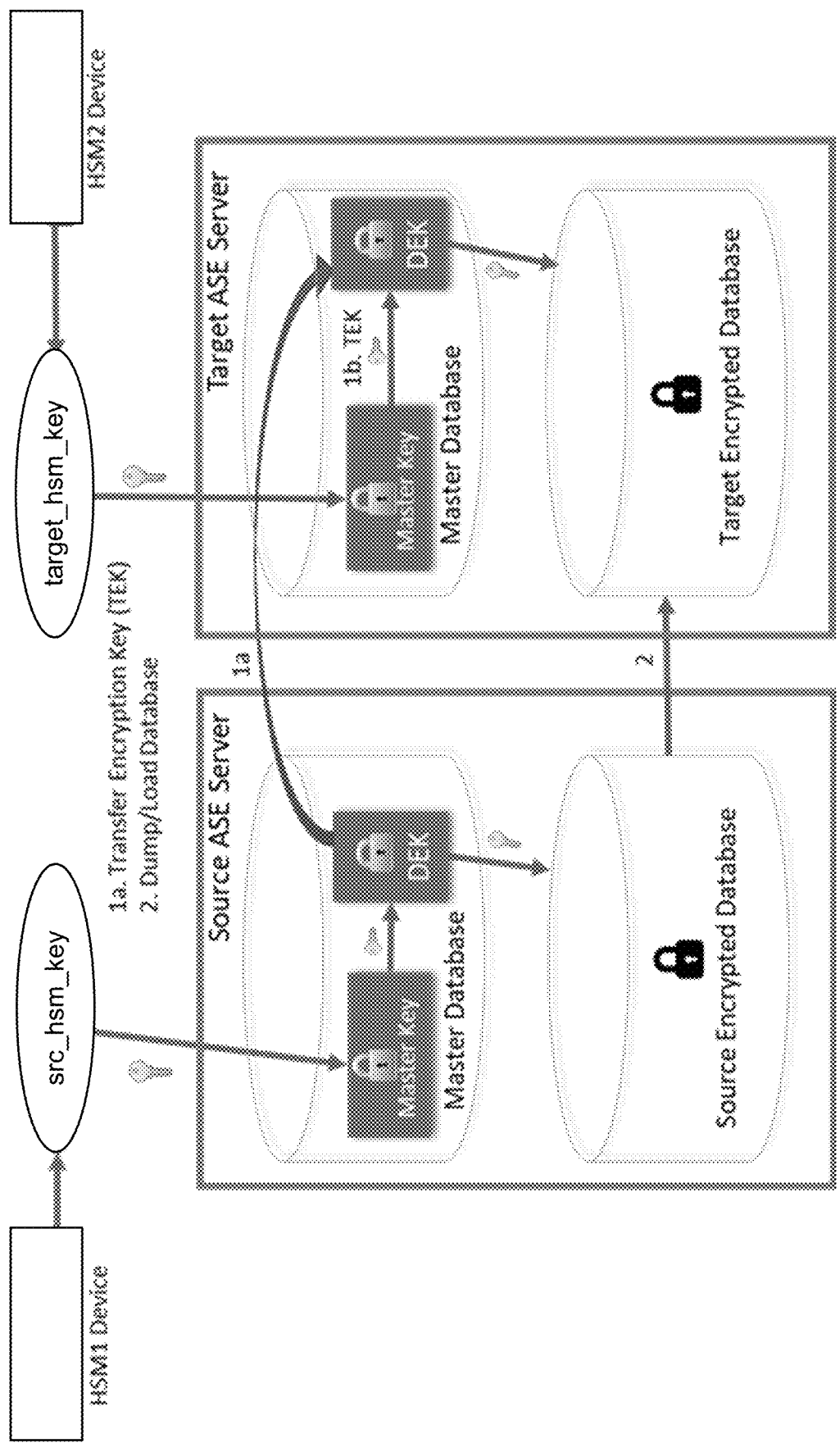
FIG. 7 illustrates a simplified diagram of a second exemplary use case.

FIG. 7 shows a simplified schematic view of a second, more complex use case. This second use case involves transfer:
- of an entire encrypted database;
- from the source ASE server having the master key of the master database encrypted with the key from external keystore,
- to the target ASE server having a different key from a different external keystore.

The DEK present in the master database is encrypted with master key.

The following pseudocode summarizes operations taking place at the source ASE database according to this second use case.

```
use master
create encryption key src_hsm_key on external keystore
create encryption key master with external key
create encryption key dek for database encryption encrypt
    with master key
create database src_encrdb encrypt with dek
dump database src_encrdb to '/path/to/dumpfile'
transfer encryption key dek
    with passwd 'mysecret8'
    to '/path/to/file'
```

At the target ASE database, per the following pseudocode the DEK will be transferred using the file (1a in FIG. 7) and encrypted with the master key of the master database on the target ASE (1b in FIG. 7) as part of TRANSFER ENCRYPTION KEY statement.

```
use master
create encryption key target_hsm_key on external keystore
create encryption key master with external key
transfer encryption key dek
    with passwd 'mysecret8'
    from '/path/to/file'
create database target_encrdb encrypt with dek
load database target_encrdb from '/path/to/dumpfile'
online database target_encrdb
```

Figure 8:
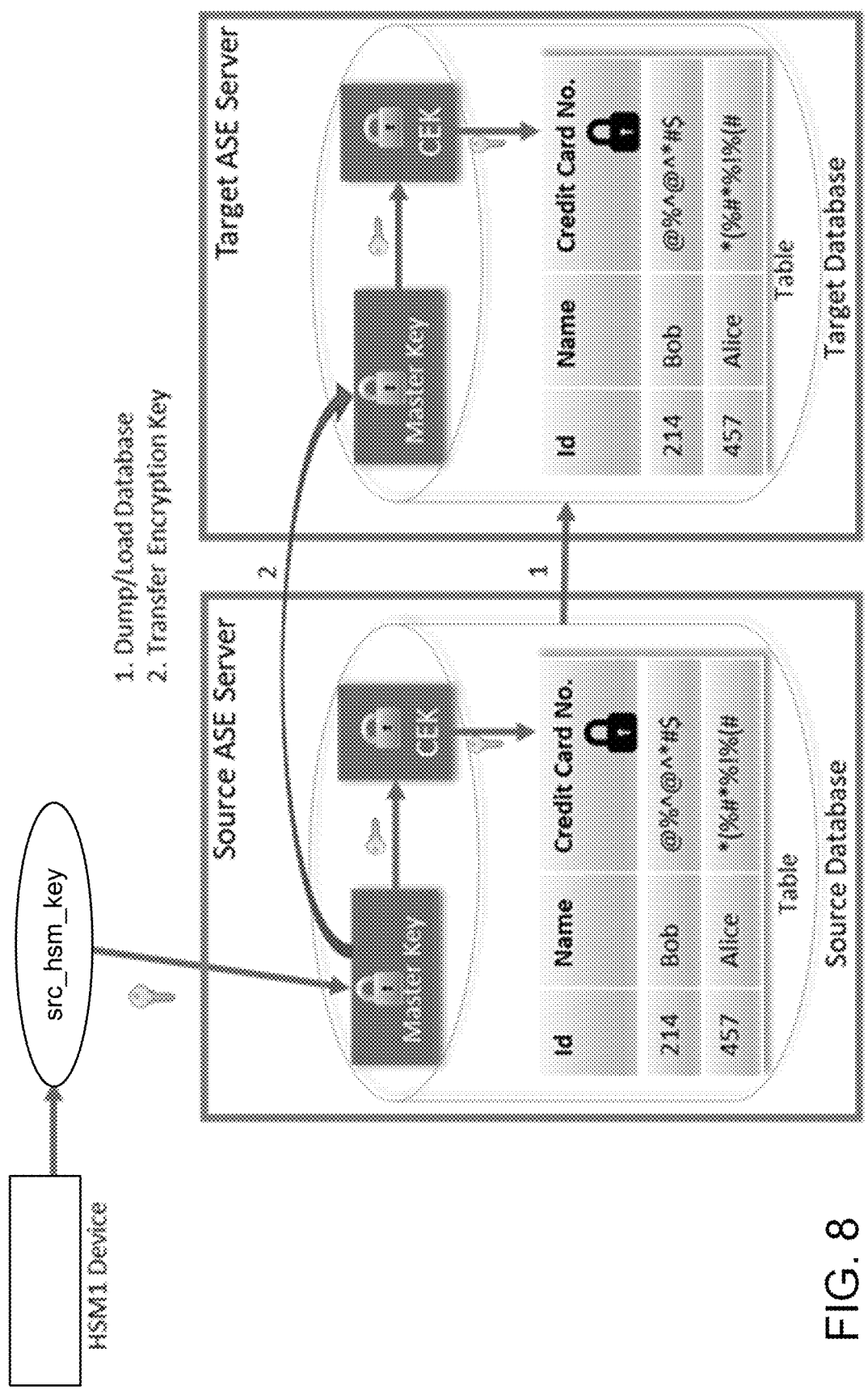
FIG. 8 illustrates a simplified diagram of a third exemplary use case.

FIG. 8 shows a simplified schematic view of still another (third) use case. Here, this specific use case shows transfer:
- of a cleartext database containing master key encrypted with key from external keystore,
- from the source ASE server,
- to the target ASE server, which has no external keystore configured.

The CEK in the database is encrypted with master key of the database.

The following pseudocode summarizes operations at the source ASE database:

```
use master
create encryption key src_hsm_key on external keystore
create database src_db
use src_db
create encryption key master with external key
use master
dump database src_db to '/path/to/dumpfile'
use src_db
transfer encryption key master
    with passwd 'mysecret8'
    to '/path/to/file'
```

As indicated by the following pseudocode, the master will be transferred using the file (2 in FIG. 8) and will remain encrypted with user specified password on the target ASE database as part of TRANSFER ENCRYPTION KEY statement.

```
use master
create database target_db
load database target_db from '/path/to/dumpfile'
online database target_db
use target_db
transfer encryption key master
    with passwd 'mysecret8'
    from '/path/to/file'
    with override
```

Figure 9:
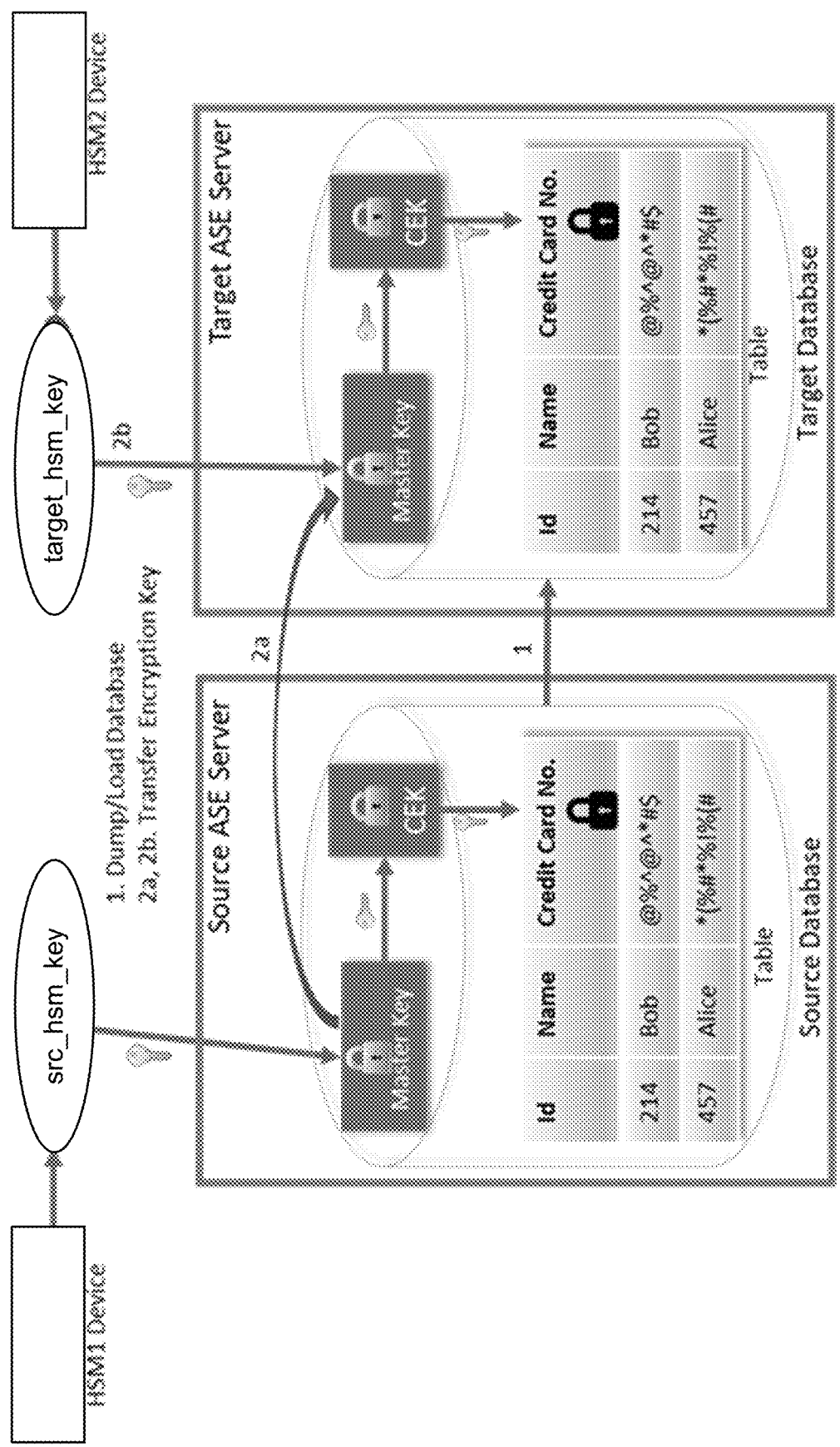
FIG. 9 illustrates a simplified diagram of a fourth exemplary use case.

FIG. 9 shows a simplified schematic view of a fourth and final use case. This use cases involves the transfer:
- of a cleartext database containing master key encrypted with key from external keystore,
- from the source ASE server,
- to the target ASE server having different key from a different external keystore.

In this fourth use case, CEK in the database is encrypted with master key of the database.

The following pseudocode describes operations occurring at the source ASE database in this fourth use case (same as in the third use case):

```
use master
create encryption key src_hsm_key on external keystore
create database src_db
use src_db
create encryption key master with external key
use master
dump database src_db to '/path/to/dumpfile'
use src_db
transfer encryption key master
    with passwd 'mysecret8'
    to '/path/to/file'
```

Per the following pseudocode, at the target ASE database a master key will be transferred using the file (2a in FIG. 9) and encrypted with key from external keystore (2b in FIG. 9) on the target ASE as part of TRANSFER ENCRYPTION KEY statement.

```
use master
create encryption key target_hsm_key on external keystore
create database target_db
load database target_db from '/path/to/dumpfile'
online database target_db
use target_db
transfer encryption key master
    with passwd 'mysecret8'
    from '/path/to/file'
    with override
```

While the above example and corresponding use cases have been described in connection with the ASE database system available from SAP SE, embodiments are not specifically limited to such an implementation and other structures could alternatively be utilized. Examples include database systems available from ORACLE and others.

Returning to FIG. 1, there the particular embodiment depicted with the engine responsible for performing the transfer being located outside of the source database. However, this is not required.

Rather, alternative embodiments could leverage the processing power of an in-memory database engine (e.g., the in-memory database engine of the HANA in-memory database available from SAP SE), in order to perform various functions.

Figure 4:
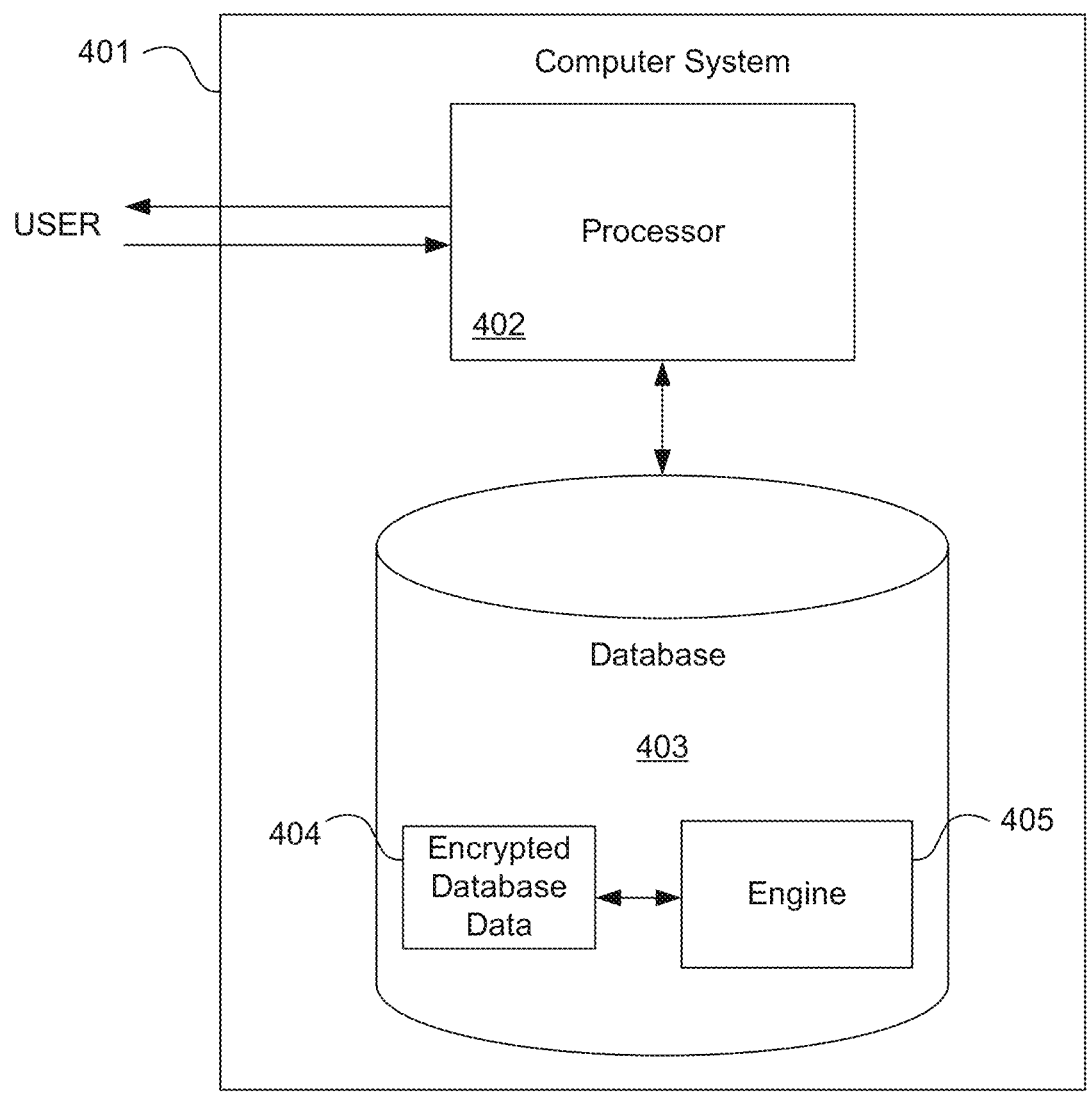
FIG. 4 illustrates hardware of a special purpose computing machine according to an embodiment that is configured to implement transfer of encryption keys.

Thus FIG. 4 illustrates hardware of a special purpose computing machine configured to implement encryption key transfer according to an embodiment. In particular, computer system 401 comprises a processor 402 that is in electronic communication with a non-transitory computer-readable storage medium comprising a database 403. This computer-readable storage medium has stored thereon code 405 corresponding to an engine. Code 404 corresponds to a database table including encrypted information. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
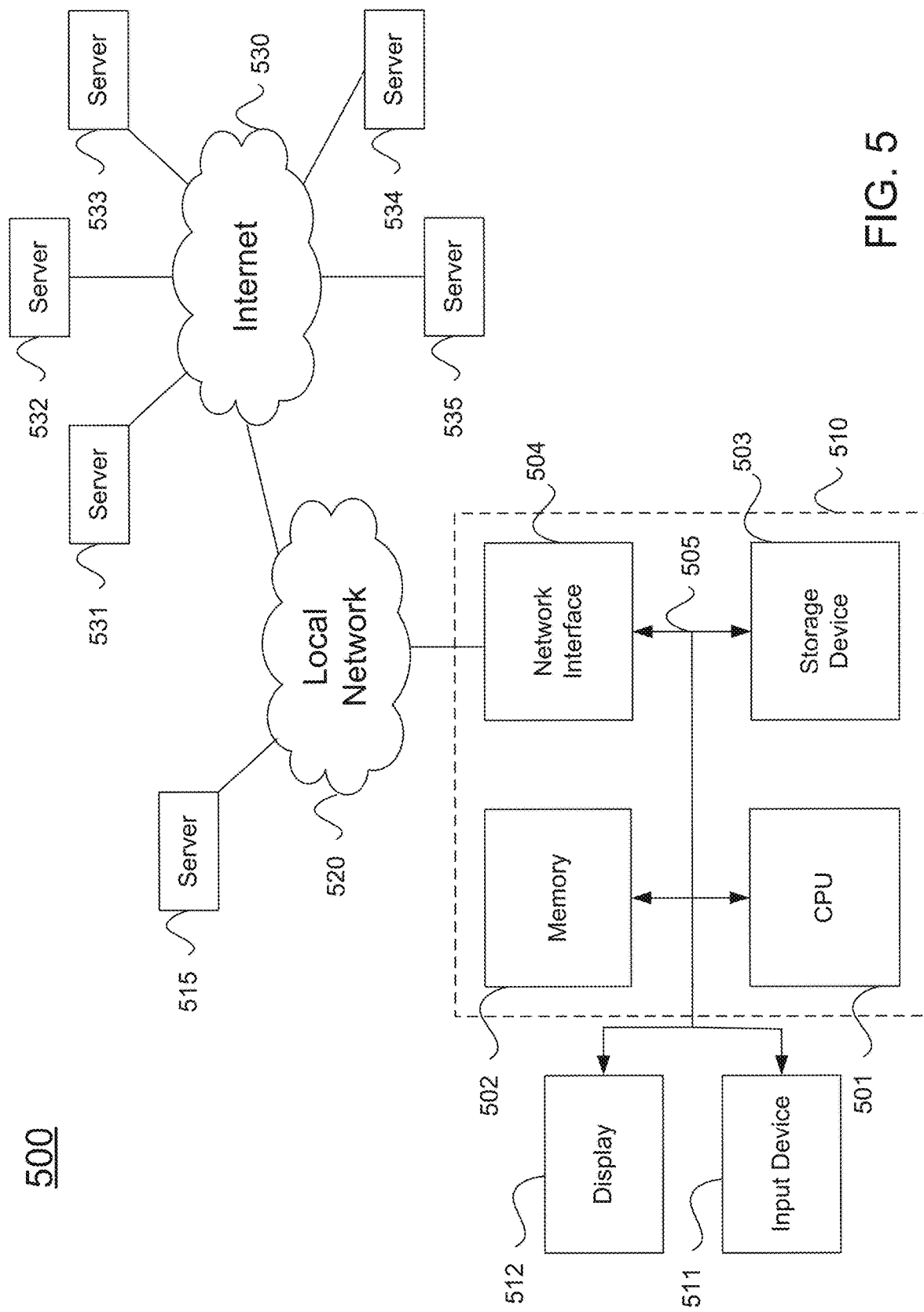
FIG. 5 illustrates an example computer system.

An example computer system 500 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    receiving a transfer command with a syntax comprising,
        a password,
        a filename,
        an override function, and
        a keyname of an individual security key or a first security key of a key hierarchy of a source database, the individual security key or the first security key encrypted according to a database key encryption type and including logic encrypted according to a logic key type different from the database key encryption type;
    receiving from an external key store, a second security key used to decrypt the encrypted first security key;
    in response to the transfer command, communicating the encrypted first security key securely by encrypting the first security key with a key derived from the password and storing the encrypted first security key in a file for consumption at a target database receiving encrypted information loaded from the source database; and
    checking a permission to access the encrypted first security key based upon the logic encryption key type.

2. A method as in claim 1 wherein:
    the second security key is at a first level of the key hierarchy;
    the first security key comprises a master key at a second level of the key hierarchy lower than the first level; and
    the encrypted information comprises an entirety of the source database.

3. A method as in claim 1 wherein:
    the second security key is at a first level of the key hierarchy;

a master security key of the source database is at a second level of the key hierarchy lower than the first level;

the first security key is at a third level of the key hierarchy lower than the second level; and the encrypted information comprises only a portion of the source database.

4. A method as in claim 1 wherein the override function is referenced to delete or re-name an existing copy of the first key in the target database.

5. A method as in claim 1 further comprising validating the first key by successfully decrypting at least a portion of the encrypted information.

6. A method as in claim 1 further comprising checking a permission to access the encrypted information, based upon the password.

7. A non-transitory computer readable storage medium embodying a computer program for performing a method, said method comprising:
receiving a transfer command with syntax comprising,
a password,
a filename,
an override function, and
a keyname of an individual security key or a first security key of a key hierarchy of a source database, the individual security key or the first security key encrypted according to a database key encryption type and including logic encrypted according to a logic key type different from the database key encryption type;
receiving from an external key store, a second security key used to decrypt the encrypted first security key;
in response to the transfer command, communicating the encrypted first security key securely by encrypting the first security key with a key derived from the password and storing the encrypted first security key in a file for consumption at a target database receiving encrypted information loaded from the source database; and
checking a permission to access the encrypted first security key based upon the logic encryption key type,
wherein the override function is referenced when a copy of the first security key is present in the target database.

8. A non-transitory computer readable storage medium as in claim 7 wherein:
the second security key is at a first level of the key hierarchy;
the first security key comprises a master key at a second level of the key hierarchy lower than the first level; and
the encrypted information comprises an entirety of the source database.

9. A non-transitory computer readable storage medium as in claim 8 wherein:
the source database comprises an in-memory database; and
communicating the first security key is performed by an in-memory database engine of the source database.

10. A non-transitory computer readable storage medium as in claim 7 wherein:
the second security key is at a first level of the key hierarchy;
a master security key of the source database is at a second level of the key hierarchy lower than the first level;
the first security key is at a third level of the key hierarchy lower than the second level; and
the encrypted information comprises only a portion of the source database.

11. A non-transitory computer readable storage medium as in claim 7 wherein the method further comprises validating the first key by successfully decrypting at least a portion of the encrypted information.

12. A non-transitory computer readable storage medium as in claim 7 wherein the method further comprises checking a permission to access the encrypted information, based upon the password.

13. A computer system comprising:
a software program, executable on said computer system comprising one or more hardware processors, the software program configured to cause an in-memory database engine of an in-memory source database to:
receive a transfer command with syntax comprising,
a password,
a filename,
an override function, and
a keyname of an individual security key or a first security key of a key hierarchy of the in-memory source database, the individual security key or the first security key encrypted according to a database key encryption type and including logic encrypted according to a logic key type different from the database key encryption type;
receive from an external key store, a second security key used to decrypt the encrypted first security key;
in response to the transfer command, communicate the encrypted first security key securely by encrypting it with a key derived from the password and storing the encrypted first security key in a file for consumption at the target database receiving encrypted information loaded from the source database; and
checking a permission to access the encrypted first security key based upon the logic encryption key type,
wherein the override function is referenced to delete or re-name an existing copy of the first key in the target database.

14. A computer system as in claim 13 wherein:
the second security key is at a first level of the key hierarchy;
the first security key comprises a master key at a second level of the key hierarchy lower than the first level; and
the encrypted information comprises an entirety of the source database.

15. A computer system as in claim 13 wherein:
the second security key is at a first level of the key hierarchy;
a master security key of the in-memory source database is at a second level of the key hierarchy lower than the first level;
the first security key is at a third level of the key hierarchy lower than the second level; and
the encrypted information comprises only a portion of the source database.

16. A computer system as in claim 13 further comprising the in-memory database engine validating the first key by successfully decrypting at least a portion of the encrypted information.

17. A computer system as in claim 13 further comprising the in-memory database engine checking a permission to access the encrypted information, based upon the password.

* * * * *